Aug. 30, 1955

E. A. KATHE 2,716,683

THERMALLY-RESPONSIVE CONTROL DEVICES
FOR ELECTRIC SWITCHES
Filed Sept. 21, 1954

INVENTOR.
Edmund A. Kathe
BY
ATTORNEYS

United States Patent Office 2,716,683
Patented Aug. 30, 1955

2,716,683

THERMALLY-RESPONSIVE CONTROL DEVICES FOR ELECTRIC SWITCHES

Edmund A. Kathe, Columbus, Ohio

Application September 21, 1954, Serial No. 457,340

5 Claims. (Cl. 200—138)

This invention relates broadly to thermally-responsive control devices for electric switches. It, more particularly, relates to an improved control device that is adapted to function within a precise range of degrees of temperature both limits of which can be manually and independently predetermined.

This application is a continuation-in-part of my copending application Serial No. 237,431, filed July 18, 1951, now abandoned.

The prime object of my invention is to provide an improved thermally-responsive control device for an electric switch of the snap-action variety whereby the switch can be alternately actuated between its circuit open and circuit closed positions in accordance with a precisely predetermined range of degrees of temperature, said range being independently variable and yet always constant to the manually predeterminable upper limit of temperature.

Another object of the invention is to provide in a control device of the character above described, accurately adjustable means for varying the actuation of a snap-action switch to its circuit closed position within a precise range of degrees of temperature, said means maintaining the range of degrees constant in relation to the upper limit thereof.

Another object of the invention is to provide in a control device of the above character, means for manually varying the upper limit of a range of degrees of temperature at which a snap-action switch will be moved to its circuit open position, said range of degrees, though independently variable, being constant to the upper limit thereof at any degree of temperature to which it may have been adjusted.

Another object of the invention is to provide in a control device of the above character, a freely mounted bimetallic element adapted to produce actuation of a snap-action switch to its circuit open position upon elongation of said element in response to ambient temperature and more especially at the upper limit of a predeterminably established range of degrees of temperature, said range of degrees being independently variable but constant in relation to the upper limit of the said range of degrees at which the said switch is opened.

A further object of the invention is to provide in a control device of the above character, a freely-mounted bimetallic element adapted to be manually adjusted in relation to the arm of a snap-action switch and to produce actuation of the arm to move the same to the circuit open position upon elongation of said element in response to ambient temperatures and more especially at the upper limit of a predeterminably established range of degrees of temperature, said range of degrees being maintained constant in relation to the upper limit thereof and means for independently varying the lower limit of said range of degrees at which the arm of said switch is actuated to the circuit closed position upon relaxation of the said bimetallic element.

A still further object of the invention is to provide in a control device of the above character an adjustably mounted member having means for supporting the free end of an arm of an electric snap-action switch in the circuit open position, said member being accurately adjustable to determine the lower limit of a preselected range of degrees of temperature and normally held stationary to establish such a range of degrees by its spaced position from an adjacent contact of said switch; a freely-mounted bimetallic element adapted to be adjusted relative to the said switch arm and in contact therewith to produce actuation of said switch arm to the said circuit open position upon elongation of the bimetallic element in response to ambient temperatures and at the upper limit of the range of degrees, the spaced position of the said adjustably mounted member being constant to maintain the lower limit of the said range of degrees in relation to the predeterminably selected upper limit of said range to control the activity of the bimetallic element in moving the arm of the said snap-action switch from the circuit open to the circuit closed position as the said element relaxes at substantially the lower limit of the preselected range of degrees of temperature.

Other objects and advantages of the invention will become more apparent during the course of the following description when read in connection with the accompanying drawing.

In the drawings, wherein like numerals are employed to designate like parts throughout the same:

Figure 1:
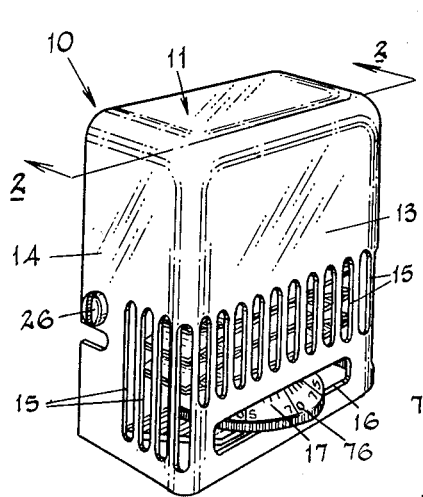
Figure 1 is a perspective of an electrical control device as constructed in accordance with the invention.
Figure 2:
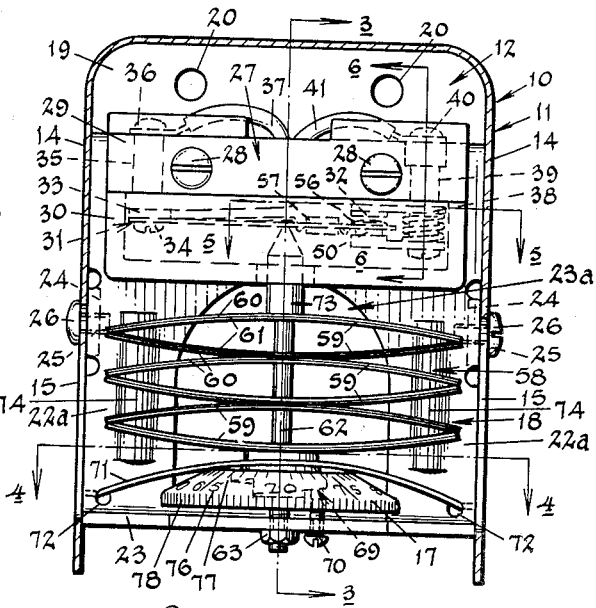
Figure 2 is a vertical, longitudinal section of the control device as taken on line 2—2 of Figure 1.

Generally speaking, control devices of the character herein to be described are thermally responsive to ambient temperature conditions and are adapted to actuate a more or less conventional snap-action switch of the so-called "micro" variety in accordance with predetermined setting of said control. The switch, in turn, may be advantageously employed to activate a heating or chilling apparatus to maintain a desired or required temperature such as that established by the manual setting of the control device. As herein set forth for purposes of illustration, the control device comprises an expansible element which operates, upon elongation or expansion, to move a movable part of the switch to the circuit open position with reference to a fixed contact thereof. The expanding activity of the element is predeterminedly controlled so that it becomes effective when a desired degree of temperature is attained. Obviously, this degree of temperature is to be manually increased or decreased according to the necessary output of heat. Likewise, when and as the said element collapses, or relaxes, according to cooling of the existing temperature conditions, it acts to initiate movement of the movable switch part to the fixed contact and circuit closed position.

A vital essence of the utility of such control devices thus lies in the sensitivity of the device and the rapidity with which the electric circuit, in which the switch is interposed, is restored. It has, therefore, now been discovered that this ability of the control device is not solely dependent on the sensitivity of the expansible element but rather upon a controlled adjustment or relation of the movable switch part to the fixed contact to the end that by predetermining the actual spacing of the end of said part from the contact the restoration of the electric circuit can be precisely determined within a desired range of temperature variance. That is to say, by increasing or decreasing the distance through which the movable switch part moves to the circuit closed position, the influence of the expansible element on said switch part can be modified in one way or the other. And this distance, as interpreted in a range of degrees, is maintainable in definite relation to the degree of temperature at which the expansible element operates to literally open the circuit through the switch.

My invention, therefore, contemplates the provision of an improved control device for opening an electric circuit through a snap-action switch at any desired degree of temperature and, within a preselected range of temperature, for predeterminedly and accurately establishing a lower degree of temperature at which the circuit will be restored. In other words, by the novel features of my control device, a snap-action switch can be actuated between its circuit opening and circuit closing positions, within the range of a fraction of a degree of temperature, or within the range of one or more degrees, the lower limit of such a range always being constant, at any adjusted setting, in relation to the upper limit thereof which is manually adjustable, at will, to any desired or required degree of temperature.

Referring now, more particularly, to the drawings, there is shown in Figure 1 of the drawing a thermally-responsive control device constructed in accordance with the present invention and designated in its entirety by the numeral 10. As therein illustrated, the device 10 consists generally of a housing member 11 and frame or base 12 contained therein. The forward and side walls 13 and 14 respectively of the housing are provided with vertically disposed, substantially rectangular slots 15 and the forward wall 13 is further provided with a horizontally disposed slot 16 for receiving the manual control dial 17 of the control mechanism 18 and permitting the same to be easily rotated.

Figure 3:
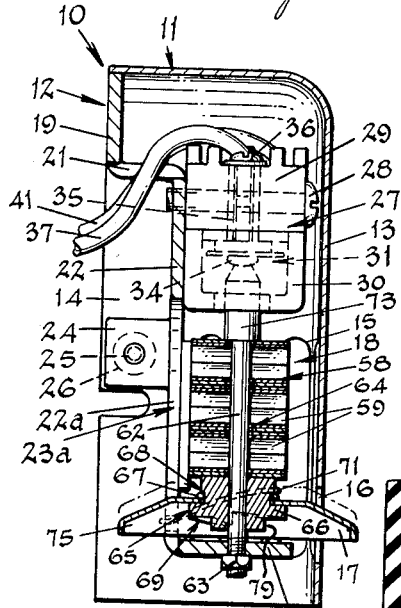
Figure 3 is a vertical, transverse section of the control device as taken on line 3—3 of Figure 2.
Figure 4:
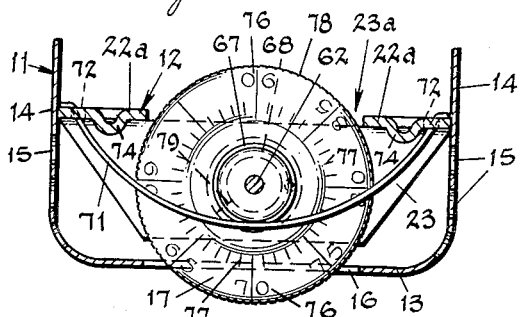
Figure 4 is a horizontal section of the device as taken on line 4—4 of Figure 2.
Figure 5:
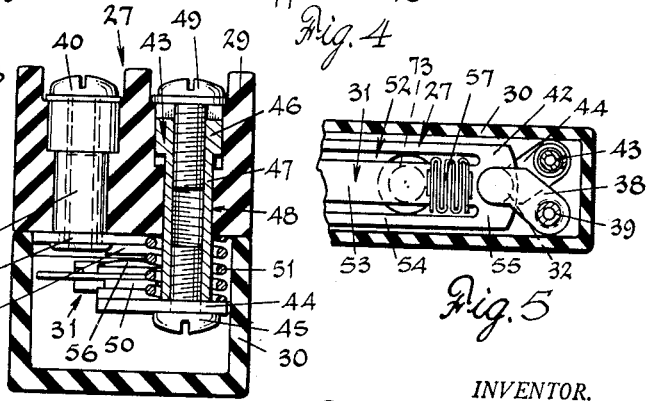
Figure 5 is a fragmentary top view of the control device, parts thereof being shown in cross section.
Figure 6:
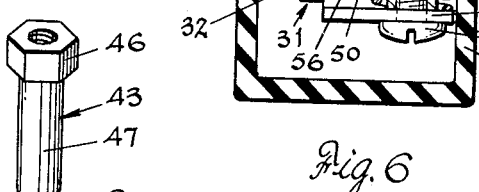
Figure 6 is an enlarged detail view of the adjusting element of the control device and as taken on line 6—6 of Figure 2.

As best shown in Figure 3, the frame 12 is suitably constructed to afford an upper, vertically directed flange 19 having mounting holes 20 therein; a horizontally disposed ledge 21 from which depends a vertically disposed and forwardly positioned wall 22. At the lower end of wall 22 there is a horizontal and forwardly directed ledge or platform 23 on which the control device 18 is bodily carried. Actually the wall 22 is formed by spaced legs 22a to provide a centrally disposed opening 23a therebetween to accommodate that portion of the dial 17, contained within the housing 11. Medially between the ledges 21 and 23 along the side edges of wall 22, two rearwardly bent tabs 24 are provided, said tabs having threaded openings 25 which receive screws 26 passed through corresponding openings in the side walls 14 of the housing 11. Generally speaking, the flange 19, ledge 21 and wall 22 nest within and snugly fit between the side walls of said housing.

A conventional snap-action switch 27 of the so-called "micro" variety is carried on the upper margin of the wall 22 by means of screws 28 and has a body portion 29 of suitable insulating, moldable material, adapted to receive screws 28 therethrough, and a casing 30 carried by and removably attached to the bottom of the body 29. The casing 30 encloses the actual operative portion 29. The casing 30 encloses the actual operative members of the switch 27 and which include a flexibly movable arm or blade 31 and a fixed contact 32. The blade 31 is supported at one or its base end 33 by means of a screw 34 threaded into the lower end of a ferrule or internally threaded sleeve 35 embedded in the body 29. At the upper end of sleeve 35, a similar screw 36 is provided for rigid attachment thereto of a lead wire 37.

At the opposite end of the body 29, the fixed contact 32 comprises a plate 38 that is fixedly carried, as by riveting or spinning over the exposed lower end of a similar internally threaded sleeve 39 embedded in the body 29. Likewise the upper end of sleeve 39 is adapted to receive a screw 40 for attachment of the second lead wire 41. Preferably the sleeve 39 is positioned at one side of the longitudinal axis of the body 29 or substantially in a corner at the immediate end thereof and the plate 38, carried at the lower end thereof is shaped substantially "dog-leg" in outline so that the fixed contact point 32 is positioned in said axis.

Figure 7:
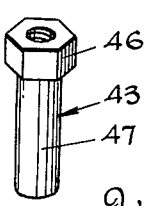
Figure 7 is a perspective view of a part of the adjusting element.

In the opposite corner of the body 29, there is provided a means for supporting the free end 42 of the blade 31 when the switch is in the circuit open position. This comprises an especially formed and internally threaded sleeve 43, vertically and slidably contained in the body 29 and a plate 44 affixed to the lower end thereof as by the screw 45. The plate 44 is adapted to be adjusted vertically and thereby increase or decrease its spacing from the fixed contact 32. More particularly, the sleeve is formed, as shown in Figure 7, to have an upper head portion 46 that is provided with flatted sides, and as herein shown as a hexagon, and a lower tubular or cylindrical portion 47. The sleeve is received in a bore 48 in the body 29 that has complementary formed hexagonal and cylindrical portions thereby enabling the sleeve to be reciprocated through the bore 48 without turning. In order to move the sleeve, a screw 49 is threaded into the upper end thereof and so that the head will bear on the upper surface of the body 29.

The plate 44, at the lower end of the sleeve, is formed substantially "dog-leg," as the plate 38 but reversely, so that a button 50 at the outer end thereof will be positioned in vertical and axial alignment with the fixed contact 32 disposed thereabove. The spacing between the contact 32 and button 50 may thus be accurately adjusted by turning the screw 49, in one direction or the other, and, by reciprocating the sleeve 43, bodily raise or lower the plate 44. In order to positively lower the sleeve and plate, a coil spring 51 is interposed between said plate and the lower surface of body 29. Now, as the screw 49 is threaded inwardly of the sleeve 43, the head thereof will bear on the body 29 and operate to lift the sleeve within the bore 48 and reduce the spacing of button 50 on plate 44 from the contact 32. Conversely, when the screw is turned outwardly of the sleeve, the spring 51, bearing against the body 29 and plate 44, will operate to lower said plate and increase the spacing for a purpose to be hereinafter more fully described.

Although in no wise forming a part of this invention and shown by way of example only since other and/or equivalent structures may herein be as adequately employed, the blade 31 consists of a conventionally thin strip of conductive spring metal in which a U-shaped slot 52 is made. The slot 52 thus forms the strip or blade 31 into a centrally disposed tongue 53 and an outer continuous marginal portion 54 which carries in its outer or the free end 42 of the blade 31 a contact 56. The tongue 53 and portion 54 are integrally joined at the base 33 of the strip 31 so that suitable flexure between their free and opposed ends may be obtained. For this purpose, a resilient member 57 is interposed between said ends and, as herein shown, comprises a sinuously bent spring element conventionally attached at one of its ends to the free end of the tongue 53 and at its other end to the end 42 or web portion 55 of the portion 54. The expanding action of the spring element 57 operates to dispose the tongue 53 and marginal portion 54 in angular planes with respect to each other and so that, in the well-known manner, to swing or "snap" the web 55 relative to the tongue 53 when it is actuated to pass through the median line of the blade 31.

The spring member 57 is normally adapted to either flex the web 55 toward the contact 32 in circuit closed position or toward the button 50 in the circuit open position. In order to actuate the spring member, an applied force is directed against the tongue 53, the effect of this force, as it is increased, being to move the spring 57 upwardly through the medial line of the blade and consequently snap the web from the contact 32 to the button 50. Upon relaxation of the said force, the biased relation of the tongue 53 and web 54 operating against the button 50 acts to move the spring member 57 downwardly and "snap" said web upwardly and carry the contact 56 thereon into engagement with the fixed contact 32.

As herein shown, the integrally associated parts of the switch blade 31 are caused to function, as above described, by means of the control mechanism 18 which is comprised of a freely-mounted bimetallic member 58 made up of a plurality of pairs of concavely bent strips or plates 59. Each of the plates 59 are formed by a pair of laminated layers of metals having different co-efficients of expansion. Thus, the layer 60 on the concave side of each plate 59 is formed of a metal or alloy having a relatively low coefficient of expansion while the layer 61 on the convex side of each plate is of a metal or alloy having a relatively high coefficient of expansion. Preferably the bent plates 58 are arranged in pairs and so that the extreme ends of the plates of each pair are in engagement.

The bimetallic member 58 is thus formed by the pairs of plates 59 which are vertically disposed so that the layers 60 on their concave sides are in contact and substantially in the center area of each plate. Under the influence of heat, the member 58 will be caused to expand or elongate bodily and, conversely, with a reduction of heat, said member will collapse or shorten bodily. The member 58 is carried on a fixed vertically disposed rod 62 which may be threaded, at its lower end, into the ledge 23 and there secured by a lock-nut 63. For mounting the bimetallic member on the rod 62, each plate 58 is provided with a centrally disposed opening 64 through which the rod passes.

The lowermost pair of plates 58 are carried by the dial 17; or, more particularly, on the upper end of a sleeve 65 to which the dial is secured. The upper plane surface of the dial is supported on a flanged enlargement 66 of the sleeve and is thereon secured by means of a locking ring 67 that is partially received in a groove 68 formed in the surface of the sleeve. Beneath the flange 66 the lower face of the sleeve is provided with a cam surface 69 (Figure 3).

The sleeve 65 is loosely and rotatably supported on the rod 62 and is adapted to reciprocate therealong as the cam surface is circularly passed relative to a fixed point such as a screw 70 threaded into the ledge 23 of the frame 12. In order to urge the sleeve 65 downwardly, a bowed wire spring 71 is so shaped as to rest in its medial portion on the ring 67 and with its ends directed rearwardly and downwardly toward openings 72 in the lower margin of the wall 22 and through which the said ends are passed so that the elastic nature of the wire spring will hold the ends frictionally against the rear surface of the wall 22.

At the upper end of the rod 62, there is loosely and reciprocally supported a thimble or cap 73 of insulation material and which rests upon the upper surface of the bimetallic member 58. In this relation, the said member 58 presses the tip of cap 73 against the tongue portion of the blade 31 at a medial point between the base 33 and the free end of the tongue at which area one end of the sinuous spring member is connected.

In order to maintain the loosely-mounted pairs of plates 59 in vertical alignment, the leg portions 22a are provided with semi-circularly formed ridges 74 which slidably engage the edges of the plates in tangential contact only and to reduce any friction.

The upper surface of the dial 17 is provided adjacent its peripheral skirt 75 with suitable legends 76 to denote a normal range of degrees of temperature at which the circuit through switch 27 will be opened. This, for example, may extend from slightly below 60° and slightly above 90° and the legends 76 are accordingly spaced apart in increments of five units which, if desired, can be indicated by the radially disposed lines 77. The skirt 75 may also be suitably indented as at 78 for easy rotation of the dial and these indentations can be spaced to further indicate single units or degrees.

The cam surface 69, previously described as being on the lower surface of sleeve 65, is spirally formed and is located with respect to the dial so that in bearing on the screw 70 and as the dial is rotated in a clock-wise direction, the cam surface will cause the sleeve to move downwardly in proceeding from the legend "60" to the legend "90." One limit of the cam surface is thus located so that a degree unit lower than "60" will be indicated while at the opposite limit of the surface a unit of degrees slightly higher than "90" will be denoted. These limits of the cam surface are arranged in vertical alignment so that the high and low points of the cam are interconnected by a vertically disposed wall 79 against which the screw 70 will come in contact when the dial 17 and sleeve 65 have been turned to select the lowest unit of degree of temperature. Quite obviously, the wall 79 prevents further movement of the dial 17 beyond the highest indication thereon or so that the temperature reading will not be inadvertently decreased to the lowest indicated degree of temperature upon continued rotation.

Naturally as the dial 17 is progressively rotated to elevate the degree of temperature as denoted by the legends 75, this effort is reflected in the operative relationship between the switch 27 and the expansible, bimetallic member 58 whereby the elongation of the member will actuate the switch or the movable blade 31 thereof to the open circuit position. However, the cam 69 is so constructed that, with a desired high degree of temperature, the sleeve 65 operates, upon turning, to lower the bimetallic member 58 bodily so that it must further elongate to actuate the switch to its open position, through the cap 73. Conversely, when it is desired to cause opening of the switch at a lower degree of temperature, the sleeve acts to raise the member 58 bodily thereby causing it to actuate the switch upon a lesser extent of elongation.

In order to calibrate or set this control device initially, a selected degree of temperature, as for example "70" may be located at the indicating position outwardly of the housing 11 and the screw 70 turned until the switch 27 is opened when a temperature of seventy degrees is arrived at.

In operation, the dial 17 is rotated to predeterminedly select the degree of temperature at which the bimetallic member 58 will actuate the switch 27. During such rotation of the dial, the sleeve 65, carrying it, is moved vertically along the fixed rod 62 by the bearing of the cam surface 69 against the screw 70. This, through the bimetallic member 58, effects a variance in the pressure of the cap 73 against the tongue 53, and through the sinuous spring 57, the web 55 supported on the button 50.

To also effect this relation of the supported web 55, the plate 44 carrying the button 50 may be raised or lowered to adjustably alter the spaced distance between said button and contact 32. Obviously, the higher the plate 44 is raised by the screw 49, the shorter will become the distance and consequently the more rapidly, the switch will be actuated between the circuit open and circuit closed positions. On the other hand, when the plate is lowered by the combined action of the screw 49 and spring 51, the more slowly will the switch be actuated. In other words, to predeterminedly establish a range of degrees within which the switch 27 will return from the circuit open to the circuit closed position, the screw 49 is adjustably turned to determine the spaced distance at which the switch blade 31 is supported at the web 55. Also this spaced distance and the rapidity or delay with which the switch 27 operates, it should be noted, is constant, once it has been set, despite the degree of temperature for which the switch is caused to move to its circuit open position by the dial 17 and through the bimetallic member 58.

When functioning, the control device 10 thus causes an electric circuit through the switch 27 to be opened when the bimetallic member 58, in response to the influence of the ambient temperature, elongates and forces the cap 73 against the blade tongue 31 to "snap" the contact 56 from fixed contact 32 and against the button 50. During the ensuing interval and as the ambient temperature varies downwardly, the bimetallic member 58 collapses and relieves its pressure on cap 73. Now at the setting or position of the button 50, the switch will return to its circuit closed position of contact 32 and 56 according to the range of the degrees of temperature which as hereinbefore mentioned may be in the order of a fraction of or one or more degrees.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

Having thus described my invention, what I claim is:

1. In a thermostatically controlled snap-action electric switch, a frame, a guide rod secured to said frame, an expansible bimetallic member floatingly guided by said rod and adapted to bodily respond to changes in the ambient temperature, a snap-action switch mechanism carried on said frame adjacent said bimetallic member, said switch mechanism having a base and including a thin, metallic switch arm secured at one of its ends to said base and being free at its other end to move to an open and closed switch position, means engageable with said bimetallic member and urged into operable contact with said switch arm intermediate its ends by said bimetallic member, means engageable with said member for varying the expansible characteristics thereof to regulate the upper degree of temperature at which said arm of the switch will move to its open position, means for limiting the extent of movement of the switch arm between its open and closed positions, and means for regulating said limiting means according to a low degree of temperature at which a reduction in pressure on said switch arm will cause the free end of said arm to snap to its closed position.

2. In a thermostatically controlled snap-action electric switch, a frame, a guide rod secured to said frame, an expansible bimetallic member floatingly guided by said rod, a snap-action switch mechanism carried on said frame adjacent said bimetallic member, said switch mechanism having an insulated base and including a fixed contact and a thin metallic arm secured at one of its ends to said base and being free at its other end to move to an open and closed switch position, a plate adjustably mounted on said switch base and adapted to limit movement of the free end of said switch arm between the open and closed switch positions, means guided by said rod above said bimetallic member and urged into contact with said switch arm intermediate its ends by said bimetallic member, means engageable with said member for varying the expansible characteristics thereof to regulate the upper degree of temperature at which the free end of said arm of the switch will move to its open position, and means for adjusting the said plate whereby the position of said plate will regulate the effect of a reduction of pressure by said first-named means and on said switch arm to snap the same to its closed position.

3. In a thermostatically controlled snap-action electric switch, a frame, a guide rod secured to said frame, an expansible bimetallic member floatingly guided by said rod and adapted to bodily respond to the raise and fall of changing ambient temperature, a snap-action switch mechanism carried on said frame adjacent said bimetallic member, said switch mechanism having a base and including a fixed contact and a switch arm secured at one of its ends to said base and being free at its other end to move to an open and a closed switch position, a tubular cap slidably carried by said guide rod in operative relation with said bimetallic member and operable thereby to contact with said switch arm intermediate its ends, means engageable with said member for varying the expansible characteristics thereof to regulate the upper degree of temperature at which said free end of the switch arm will move to its open position, an adjustably mounted plate for supporting the switch arm in the said open position, and means for regulating the position of said plate with respect to the said fixed contact whereby the free end of said arm will move into its closed position against the fixed contact at a constant degree of temperature below the above-mentioned upper degree of temperature.

4. A combination according to claim 3 in which the means for varying the expansible bimetallic member comprises a rotatable dial which axially engages said member intermediate its ends, a cam on said dial, and a fixed follower for said cam so that rotation of said dial will move it axially to vary the expansible characteristics of said member.

5. A combination according to claim 4 in which the means for regulating the position of said switch plate comprises an axially movable sleeve to which the plate is attached, a spring surrounding said sleeve and engaging said plate tending to urge it away from said fixed contact, and a screw threaded into said sleeve and engaging a fixed support so that it is adjustable to overcome said spring and move said plate closer to said fixed contact.

References Cited in the file of this patent

UNITED STATES PATENTS

| | | |
|---|---|---|
| 1,976,843 | Eskin | Oct. 16, 1934 |
| 2,060,836 | Taxner | Nov. 17, 1936 |